Aug. 19, 1969  F. FEND  3,461,925
CONTROL ARRANGEMENT FOR A BRANCH LOPPING APPARATUS
Filed May 31, 1967  2 Sheets-Sheet 1

INVENTOR
Fritz Fend
By: Low and Berman
Agents

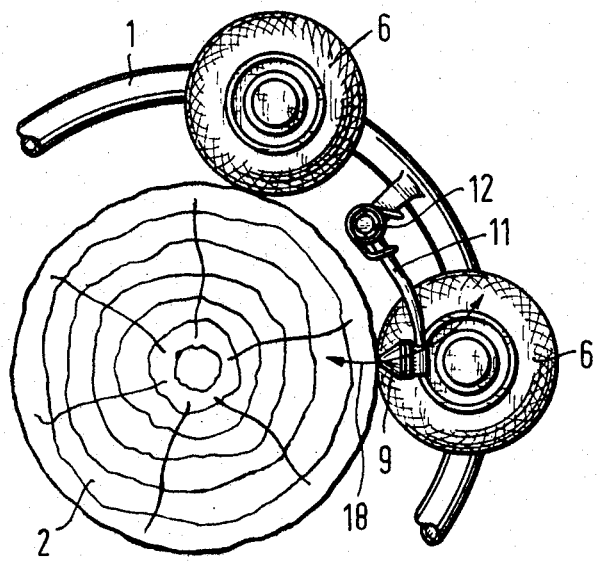
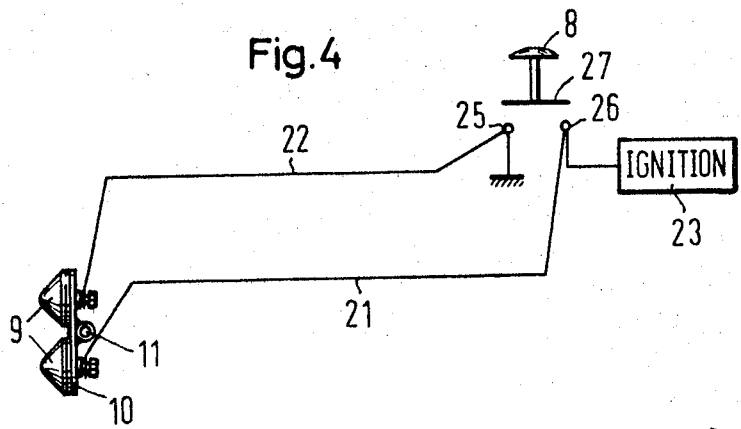

United States Patent Office 3,461,925
Patented Aug. 19, 1969

3,461,925
CONTROL ARRANGEMENT FOR A BRANCH LOPPING APPARATUS
Fritz Fend, Regensburg, Germany, assignor to Fichtel & Sachs A.G., Schweinfurt, Germany
Filed May 31, 1967, Ser. No. 642,466
Claims priority, application Germany, June 11, 1966, F 49,464
Int. Cl. B27b 17/00, 29/00
U.S. Cl. 144—2                                                 9 Claims

ABSTRACT OF THE DISCLOSURE

The descent of an automatic branch lopping apparatus from a tree trunk under the driving force of an internal combustion engine is stopped at a safe distance above the ground by shorting the ignition circuit when two spaced contacts on the apparatus simultaneously engage bare wire netting attached to the tree trunk at a suitable level.

BACKGROUND OF THE INVENTION

This invention relates to the removal of lower branches from the trunks of standing trees, and particularly to an automatic control arrangement for stopping the descent of an automatic branch lopping apparatus at a safe distance above the ground.

More specifically, this invention is concerned with an improvement in the apparatus for lopping branches from a tree trunk disclosed in the commonly owned application, Ser. No. 527,300, filed on Feb. 14, 1966, and now Patent 3,364,961.

The apparatus disclosed in the afore-mentioned application removes branches from the lower trunk portions of standing or living trees by means of a motorized device which moves upward along the tree in a helical path to a height which may be set in advance, and thereafter reverts to the ground. The motor must be stopped before the apparatus hits the ground or a tree root in order to avoid damage to the tree or the apparatus.

Since it is time consuming, difficult, and even dangerous for an operator to stop the motor by means of manual controls, it has been proposed heretofore that sensing means be provided for sensing the downward distance traveled, the length of time elapsed from the reversal of the direction of movement, or the distance from the ground, and to stop the downward movement in response to a signal derived from the sensed value.

While the earlier control arrangements are successful under most conditions, those which rely on sensing an elapsed time or a distance traveled require better judgment than is available from some operators. Those arrangements which sense the distance between the traveling apparatus and the ground, rely on slender sensing rods not capable of withstanding rough handling, and require more caution during transfer of the apparatus from one tree to the other than some workers in the field are capable of applying.

The object of the present invention is the provision of a control arrangement for a branch lopping apparatus of the type described which is practically foolproof, and can be handled roughly without being damaged.

SUMMARY OF THE INVENTION

The invention is applicable to all automatic branch lopping apparatus of the afore-described type which is moved in its helical path about the tree trunk by a motor which is at least to some extent electrically operated, so that its driven movement can be stopped by cutting the electric current supply to the motor.

The supporting structure of the apparatus is provided, according to this invention, with two spaced, exposed contacts which are mounted in such a manner that they engage the tree trunk during movement of the apparatus in its helical path. The contacts are connected with the current source by a circuit which cuts the supply when the contacts are conductively connected.

The operator needs only to fasten a conductive member to the surface of the tree trunk where it can be simultaneously engaged by the two contacts during the descending movement of the apparatus. It is necessary, of course, that the contact face of the conductive member have at least one dimension greater than the spacing of the contacts on the branch lopping apparatus.

The contacts, while traveling over the surface of the tree, normally over the bark, are likely to pick up a coating of rosin or other electrically insulating material before they reach the conducting member. It is therefore preferred to provide the latter with projections and recesses in the contact face thereof which tend to wipe foreign matter from the contacts.

Least skill is required by the operator if the conductive member consists of sheet-like material flexible enough to be wrapped about the tree trunk and having a maximum dimension at least equal to the circumference of the helical path of the branch-lopping apparatus, and therefore greater than the circumference of the largest tree trunk capable of being handled by the apparatus. The fastener which secures the conducting member to the trunk may then hold two opposite edge portions of the sheet-like member in overlapping relationship. When the direction of overlap is the direction of angular movement of the branch-lopping apparatus, the helically descending apparatus cannot snag an edge of the conductive sheet.

Woven wire screen is the preferred material of the conductive member. When its dimensions are sufficient for maintaining engagement of the contacts with the screen during movement of the lopping apparatus through at least a full turn of its helical path, the contacts are wiped clean of rosin and the like even under unfavorable conditions.

To insure sufficient contact pressure between the two traveling contacts and the normally stationary conductive member, it is advisable to interpose a movable contact carrier assembly between the supporting structure of the branch-lopping apparatus and the contacts, and to bias the carrier assembly in a direction for engagement of the contacts with the trunk during the helical movement of the apparatus. The carrier assembly may consist of an arm having one end pivotally mounted on the supporting structure, and pivotally supporting a carrier member on its other, free end, electrical insulation being interposed between the carrier member and at least one of the contacts which are supported on the same. Good contact with a conductive member on an irregularly shaped tree trunk is maintained if the carrier member pivots on the free end of the arm in a plane which is at least approximately axial with respect to the helix in which the apparatus travels, and when the two contacts are spaced from each other in that plane.

It has been found that contacts having the approximate shape of a cone with rounded apex fastened to the carrier member by their bases are most durable, particularly when made of austenitic stainless steel of the V2A (18-8) type.

BRIEF SUMMARY OF THE DRAWING

The attached drawing shows a preferred embodiment of the invention.

FIG. 2 shows the apparatus of FIG. 1 in fragmentary plan view;

FIG. 4 is a partial schematic view of the electrical circuit of the apparatus of FIG. 1.

DESCRIPTION OF THE PREFERRED EMBODIMENT

Figure 1:
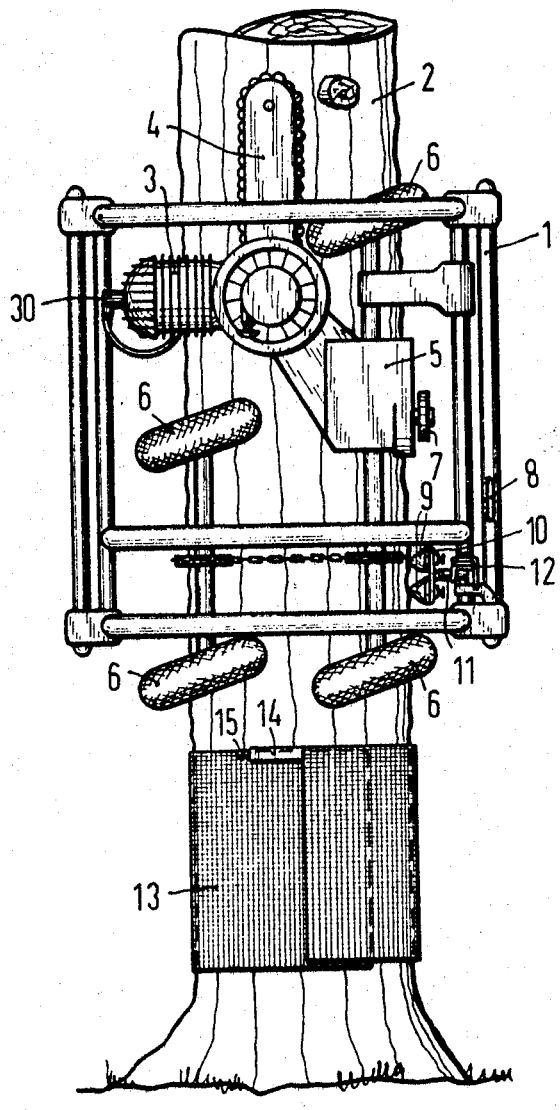
FIG. 1 shows a branch-lopping apparatus equipped with the control arrangement of the invention while in operative position on a tree trunk, the view being in side elevation.

FIG. 1 shows the supporting frame 1 of a branch-lopping apparatus more fully described in the afore-mentioned application its normal operating position in which it envelops a tree trunk 2. The apparatus is energized by a gasoline-powered, single-cylinder, internal combustion engine 3 equipped with an electrically operated sparkplug 30. The motor 3 drives a chain saw 4 which cuts branches from the tree trunk 2 during the helical upward movement of the frame 1, obliquely mounted guide and drive wheels on the frame 1 being connected to the motor 3 by a transmission 5 which reverses the direction of rotation of the wheels after an ascent, the length of which may be set in advance by means of a control knob 7 on the transmission.

A manual shorting switch 8 near the lower end of the frame 1 permits the spark gap of the plug 30 to be shunted, thereby cutting the electrical current supply from the motor 3, the current being produced by a dynamo coupled to the motor in a manner conventional in chain saws. The shorting switch 8, while provided for convenience, is not used during normal operation of the apparatus.

Figure 3:
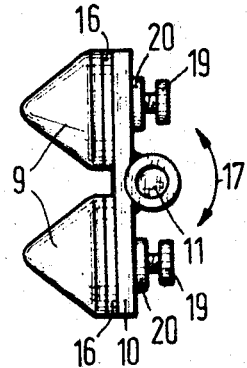
FIG. 3 shows the traveling contacts of the apparatus and associated elements on a larger scale in a view corresponding to FIG. 1.

As is seen in more detail in FIGS. 2 and 3, two contacts 9 are mounted in normally vertical alignment on a common carrier member 10, the latter being pivotally secured to the free end of an arm 11 whose other end is rotatably attached to the frame 1. As indicated by the arrow 17 (FIG. 2), the carrier 10 with the contacts 9 pivots on the arm 11 in a plane which is parallel to the upright axis of the tree trunk and thus to the axis of the helical path in which the frame 1 is moved by the wheels 6. The free end of the arm 11 moves in a radial plane as indicated by the arrow 18 (FIG. 3), and is biased by a helical torsion spring 12 to press the contacts 9 against the tree trunk 2.

The contacts 9 are provided with respective binding posts 19 which are mounted on the carrier member 10, and insulated from the same by washers 20.

Reverting to FIG. 1, there is seen a rectangular bronze wire screen 13 of a length sufficient to extend around the circumference of the tree trunk 2 with a substantial overlap of its vertical edge portions, and fastened to the tree by a rubber strap 14 attached to the overlapping edge portion, and carrying a hook 15 at its free end. The hook engages the screen 13 in such a manner that the resilient tension of the strap 14 secures the screen 13 to the trunk 2 at a safe distance above the ground. The width of the screen 13 is sufficient to engage the contacts 9 while the frame 1 travels in a full turn about the trunk 2

The schematic of FIG. 4 shows a high-voltage conductor 21 and a ground lead 22 respectively attached to the binding posts 19. The high voltage wire is connected to the high-voltage terminal of the sparkplug 30 in the ignition circuit 24 in a known manner more fully illustrated in the afore-mentioned application.

The fixed contacts 25, 26 of the switch 8 are respectively connected to the conductor 21 and the lead 22 and are not normally connected by the movable contact 27 of the switch.

When the contacts 9 engage the screen 13 during descent of the frame 1 under the power of the motor 3, the sparkplug 30 is shorted even when the contacts are coated with rosin when reaching the screen. The rosin is wiped off by the rough screen surface. In the absence of an igniting spark, the motor is stopped by friction, particularly in the transmission 5, and the non-illustrated dynamo cannot supply further current.

If necessary or desired, the motor may be stopped, and movement of the frame 1 thereby arrested, by closing the manual switch 8 which overrides the automatic control arrangement.

Modifications and variations of the illustrated embodiment of the invention, and particularly of the electrical circuit will readily suggest themselves. A relay may be interposed in an obvious manner between the contacts 9 and the sparkplug 30 in the ignition circuit 24, and the use of a relay is obviously desirable in an apparatus of the type described in which the internal combustion motor 3 is replaced by an electric motor. When the contacts 9 are conductively connected, the relay, whose coil is arranged in series circuit with the contacts and a current source, attracts its armature and thereby opens the power supply circuit of the electric motor.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In an apparatus for lopping branches from the trunk of a standing tree, the apparatus having a support, guide means for guiding the support in a helical path upward and downward on the trunk, drive means including a motor for moving said support in said path, said motor depending on a supply of electric current for operation, cutting means on the support for cutting branches projecting from said trunk toward said path during said movement of said support, and control means for cutting the supply of electric current from a source thereof to said motor, the improvement in the control means which comprises:
    (a) two spaced exposed contact members mounted on said support for engagement with said trunk during movement of said support in said path;
    (b) circuit means connecting said contact members with said current source for cutting said supply when said contact members are conductively connected;
    (c) a conductive member having a contact face greater in at least one dimension than the spacing of said contact members; and
    (d) fastening means for fastening said conductive member to the surface of said trunk in a position in which said contact members can simultaneously engage said contact face during said movement of said support.

2. In an apparatus as set forth in claim 1, said conductive member being formed with projections and recesses in said contact face thereof.

3. In an apparatus as set forth in claim 2, said conductive member being a wire screen.

4. In an apparatus as set forth in claim 1, said conducting member being sheet-like, said one dimension of said conducting member being at least equal to the circumference of said helical path, and said fastening means including means for holding two opposite edge portions of said conducting member is circumferentially overlapping relationship while said member is wrapped about said trunk.

5. In an apparatus as set forth in claim 4, the area of said conducting member being sufficient for maintaining engagement of said contact members with said conducting member during movement of said support through at least one turn of said helical path.

6. In an apparatus as set forth in claim 1, contact carrier means movably interposed between said support and said contact members, and biasing means urging said carrier means in a direction for engagement of said contact members with said trunk during said movement of said support.

7. In an apparatus as set forth in claim 6, said carrier means including an arm having one end pivotally mounted on said support and a free end, a carrier member pivotally mounted on said free end for angular movement in a plane substantially axial relative to said path, said contact members being spacedly mounted on said carrier member in said plane, and electrical insulating means interposed between said carrier member and at least one of said contact members.

8. In an apparatus as set forth in claim 7, each contact member having the approximate shape of a cone with rounded apex, the base of each contact member being fastened to said carrier member.

9. In an apparatus as set forth in claim 1, a manually operated shorting switch mounted on said support in parallel circuit with said contact members.

References Cited

UNITED STATES PATENTS 3,364,961    1/1968    Otterbach et al. __ 143—32 XR

FRANCIS S. HUSAR, Primary Examiner

143—43